UNITED STATES PATENT OFFICE.

JACOB FELL, OF UNIONTOWN, PENNSYLVANIA.

IMPROVEMENT IN MEDICAL COMPOUNDS OR SALVES.

Specification forming part of Letters Patent No. 130,908, dated August 27, 1872.

SPECIFICATION.

I, JACOB FELL, of Uniontown, Fayette county, and State of Pennsylvania, have invented a certain Compound for the Cure of Burns and Sores, as fully described below.

The nature of my invention consists in compounding and mixing together bees-wax, fresh butter, flaxseed-oil, white lead, and bone-dust in the proper portions to produce a salve for the cure of burns and sores; and the proportions found to be most efficacious are as follows: Bees-wax, one ounce; fresh butter, two ounces; flaxseed-oil, three ounces; white lead, one grain; bone-dust, two grains.

The object in adding the white lead is to prevent the formation of "proud flesh," or to kill it, if already formed. The bone-dust is to prevent or remove inflammation, and the other ingredients to produce a soft and agreeable cerate, which excludes air, keeps the skin soft and pliable, has a salutary drawing property, and causes the very worst kind of burns, scalds, and wounds to heal rapidly and certainly without leaving any scar, mark, or disfigurement upon the skin of any kind whatever.

Claim.

I claim as my invention—

The compound, salve, or ointment for the cure of burns, scalds, sores, &c., compounded in the proportions substantially as set forth.

JACOB FELL.

Witnesses:
D. S. STEWART,
A. C. NUTT.